US012341246B2

(12) United States Patent
Eom

(10) Patent No.: US 12,341,246 B2
(45) Date of Patent: Jun. 24, 2025

(54) WAVEGUIDE-STRIPLINE FEED TRANSITION ELEMENT WHERE A PORTION OF INPUT POWER IS RADIATED BY AN ANTENNA AND THE REMAINING INPUT POWER IS COUPLED TO A WAVEGUIDE-STRIPLINE

(71) Applicant: ELECTRONICS AND TELECOMMUNICATIONS RESEARCH INSTITUTE, Daejeon (KR)

(72) Inventor: Soon Young Eom, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 300 days.

(21) Appl. No.: 18/077,401

(22) Filed: Dec. 8, 2022

(65) Prior Publication Data

US 2023/0299454 A1 Sep. 21, 2023

(30) Foreign Application Priority Data

Mar. 15, 2022 (KR) ........................ 10-2022-0032382

(51) Int. Cl.

*H01Q 13/22* (2006.01)
*H01P 3/12* (2006.01)
*H01P 5/107* (2006.01)

(52) U.S. Cl.

CPC ............ *H01Q 13/22* (2013.01); *H01P 3/121* (2013.01); *H01P 5/107* (2013.01)

(58) Field of Classification Search

CPC ................................ H01P 5/107; H01Q 13/22

(Continued)

(56) References Cited

U.S. PATENT DOCUMENTS 3,732,508 A 5/1973 Ito et al.
4,652,839 A 3/1987 Tadachi et al.

(Continued)

FOREIGN PATENT DOCUMENTS

KR 10-2008-0034971 A 4/2008
KR 10-2011-0101914 A 9/2011

(Continued)

OTHER PUBLICATIONS

Pe Pasternack the Engineer's RF Source, "WR-112 CPR-112G Grooved Flange to N Female Waveguide to Coax Adapter Operating From 7.05GHz to 10 GHz, X Band", 2016, PE9837 Rev 1.1.

(Continued)

*Primary Examiner* — Benny T Lee
(74) *Attorney, Agent, or Firm* — LRK PATENT LAW FIRM

(57) ABSTRACT

Provided is a waveguide-stripline feed transition element having a radiation function. The waveguide-stripline feed transition element includes a lower element in which a waveguide feed port is arranged, an upper element including a slot opening configured to radiate a portion of input power transmitted through the waveguide feed port to a free space, and a circuit board including a strip feed port configured to transmit remaining input power except for the portion of the input power radiated through the slot opening, the circuit board being arranged between the upper element and the lower element.

11 Claims, 9 Drawing Sheets

(58) Field of Classification Search
USPC .................................................... 333/26, 237
See application file for complete search history.

(56) References Cited

U.S. PATENT DOCUMENTS

| | | | | |
|---|---|---|---|---|
| 7,872,609 | B2 | 1/2011 | Ou et al. | |
| 9,954,288 | B2 | 4/2018 | Luk et al. | |
| 10,044,112 | B2 | 8/2018 | Park et al. | |
| 10,096,907 | B2 | 10/2018 | Hong et al. | |
| 2020/0158757 | A1 * | 5/2020 | Ermolov et al. .... | G01R 1/06772 |

FOREIGN PATENT DOCUMENTS

| | | | |
|---|---|---|---|
| KR | 10-2021-0005285 | A1 | 1/2021 |
| KR | 10-2021-0035316 | A | 3/2021 |
| KR | 10-2021-0122630 | A | 10/2021 |

OTHER PUBLICATIONS

Azzemi Ariffin et al., “Broadband Transition from Microstrip Line to Waveguide Using a Radial Probe and Extended GND Planes for Millimeter-Wave Applications”, Progress In Electromagnetics Research Letters, vol. 60, 95-100, 2016.

V. A. Rudakov et al., “Compact Wide-Band Coaxial-To Waveguide Microwave Transitions for X and Ku Bands”, International Conference on Antenna Theory and Techniques, 2013, Odessa, Ukraine, pp. 475-477.

Seema Tomar et al., “E-Plane Waveguide to Microstrip Transition for Millimeter Wave Applications”, ResearchGate, Conference Paper • Dec. 2010.

Keysight Technologies, “Keysight K281C Coaxial Waveguide Adapter 18 to 26.5GHz”.

* cited by examiner

WAVEGUIDE-STRIPLINE FEED TRANSITION ELEMENT WHERE A PORTION OF INPUT POWER IS RADIATED BY AN ANTENNA AND THE REMAINING INPUT POWER IS COUPLED TO A WAVEGUIDE-STRIPLINE

CROSS-REFERENCE TO RELATED APPLICATION

This application claims the benefit of Korean Patent Application No. 10-2022-0032382 filed on Mar. 15, 2022, in the Korean Intellectual Property Office, the entire disclosure of which is incorporated herein by reference for all purposes.

BACKGROUND

1. Field of the Invention

One or more embodiments relate to a waveguide-stripline feed transition element having a radiating function.

2. Description of Related Art

A frequency-scan array antenna having a mono-pulse function includes a combination of a plurality of sub-arrays provided with power from a series-feed circuitry. Each sub-array provides electronic beam scanning characteristics by using a mounted phase shifter element. Much research is ongoing to improve the efficiency of an opening of the array antenna and reduce a side lobe level characteristic by using a waveguide-stripline feed transition element included in the sub-array and to improve the performance of the antenna by reducing a physical size of the array antenna.

SUMMARY OF THE INVENTION

According to an aspect, there is provided a waveguide-stripline feed transition element including a lower element in which a waveguide feed port is arranged, an upper element including a slot opening configured to radiate a portion of input power transmitted through the waveguide feed port into a free space, and a circuit board including a strip feed port configured to transmit, to a waveguide-stripline, remaining input power except for the portion of the input power radiated through the slot opening, the circuit board being arranged between the upper element and the lower element.

The strip feed port may include a first strip feed port configured to transmit, to a first waveguide-stripline, the remaining input power except for the portion of the input power radiated through the slot opening in a first direction and a second strip feed port configured to transmit, to a second waveguide-stripline, the remaining input power in a second direction, opposite to the first direction.

The waveguide-stripline feed transition element may be configured to adjust an amount of the remaining input power transmitted through the strip feed port to the waveguide-stripline and an amount of the portion of the input power radiated into the free space, according to at least one of an offset distance from a center line of the slot opening, a width of the slot opening, and a length of the slot opening.

The amount of the portion of the input power radiated into the free space may decrease as the offset distance from the center line of the slot opening increases.

The amount of the portion of the input power radiated into the free space may increase as at least one of the width of the slot opening and the length of the slot opening increases.

The strip feed port may include a small miniature assembly (SMA) connector port.

The circuit board may further include a conductive via-hole.

According to an aspect, there is provided an antenna including a plurality of waveguide-stripline feed transition elements arranged in a horizontal direction or a vertical direction. Each waveguide-stripline feed transition element may include a lower element in which a waveguide feed port is arranged, an upper element including a slot opening configured to radiate a portion of input power transmitted through the waveguide feed port into a free space, and a circuit board including a strip feed port configured to transmit remaining input power except for the portion of the input power radiated through the slot opening, the circuit board being arranged between the upper element and the lower element.

The strip feed port may include a first strip feed port configured to transmit the remaining input power except for the portion of the input power radiated through the slot opening in a first direction and a second strip feed port configured to transmit the remaining input power in a second direction, opposite to the first direction.

The waveguide-stripline feed transition element may be configured to adjust an amount of the remaining input power transmitted through the strip feed port to a waveguide-stripline and an amount of the portion of the input power radiated into the free space, according to at least one of an offset distance from a center line of the slot opening, a width of the slot opening, and a length of the slot opening.

The amount of the portion of the input power radiated into the free space may decrease as the offset distance from the center line of the slot opening increases.

The amount of the portion of the input power radiated into the free space may increase as at least one of the width of the slot opening and the length of the slot opening increases.

The strip feed port may include an SMA connector port.

The circuit board may further include a conductive via-hole.

The plurality of arranged waveguide-stripline feed transition elements may be disconnected from each other and have a same radiation characteristic.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF THE INVENTION

Figure 1:
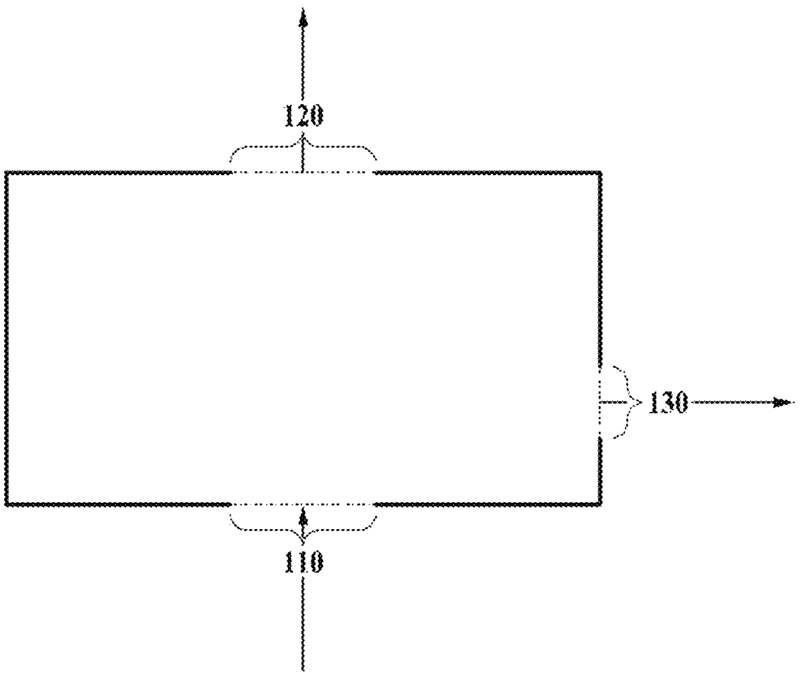
FIG. 1 is a block diagram illustrating a structure of a waveguide-stripline feed transition element including a three-port network, according to an embodiment.

The following detailed structural or functional description is provided as an example only and various alterations and modifications may be made to the embodiments. Here, embodiments are not construed as limited to the disclosure and should be understood to include all changes, equivalents, and replacements within the idea and the technical scope of the disclosure.

Terms, such as "first", "second", and the like, may be used herein to describe various components. Each of these terminologies is not used to define an essence, order or sequence of a corresponding component but used merely to distinguish the corresponding component from other component(s). For example, a "first component" may be referred to as a "second component", and similarly the "second component" may also be referred to as the "first component".

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like constituent elements throughout the detailed description of the drawings and a repeated description related thereto will be omitted.

FIG. 1 is a block diagram illustrating a structure of a waveguide-stripline feed transition element including a three-port network, according to an embodiment.

In a waveguide-stripline feed transition element included in a conventional array antenna, a function of radiating power into a free space is absent. When sub-arrays are formed with waveguide-stripline feed transition elements without a radiation function and the sub-arrays are arranged to form a linear array antenna, a distance between the sub-arrays are spaced apart by a distance identical to a distance between the waveguide-stripline feed transition elements. In this case, a side lobe level characteristic, of which power is radiated in directions other than a main beam in horizontal direction patterns of an antenna directivity of an entire array antenna, may increase. Usually, when power is fed through a waveguide-stripline, a range of the electronic beam scan decreases as a particular side lobe level increases, leading to a reduction of performance of the array antenna. In addition, when the distance between the sub-arrays are spaced apart as in the prior art, although the directivity increases following an increase in a physical size of the entire array antenna, a non-radiation zone is generated between the sub-arrays, reducing an efficiency of an opening of the array antenna and thus causing reduction in the overall performance. Hereinafter, disclosed are a configuration and performance of the waveguide-stripline feed transition element for improving the performance of the array antenna through the configuration of the waveguide-stripline feed transition element radiating power to the upper free space.

Referring to FIG. 1, a waveguide-stripline feed transition element including a three-port network, according to an embodiment, may include a lower element in which a waveguide feed port 110 is arranged, an upper element including a slot opening 120 for radiating a portion of input power transmitted through the waveguide feed port 110 into the free space, and a circuit board including a strip feed port 130 for transmitting, to a waveguide-stripline, remaining input power except for the portion of the input power radiated through the slot opening 120 and arranged between the upper element and the lower element. The waveguide-stripline feed transition element including the three-port network may receive power input through the waveguide feed port 110, radiate the portion of the input power into the free space through the slot opening 120, and feed the remaining portion of the input power to a waveguide-stripline through the strip feed port 130.

FIGS. 2A to 2D are three-dimensional (3D) separation views and 3D combination views illustrating a waveguide-stripline feed transition element including a three-port network, according to an embodiment.

Figure 2A:
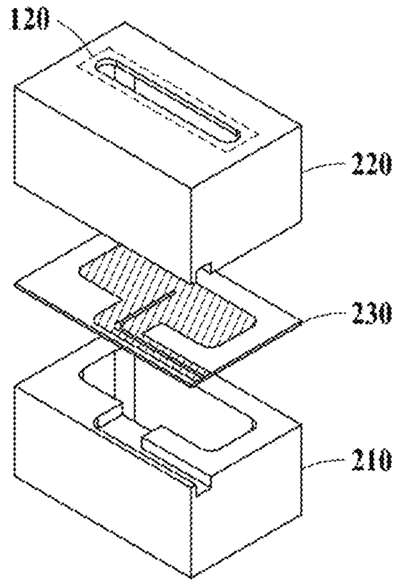
FIGS. 2A to 2D are three-dimensional (3D) separation views and 3D combination views illustrating a waveguide-stripline feed transition element including a three-port network, according to an embodiment.
Figure 2B:
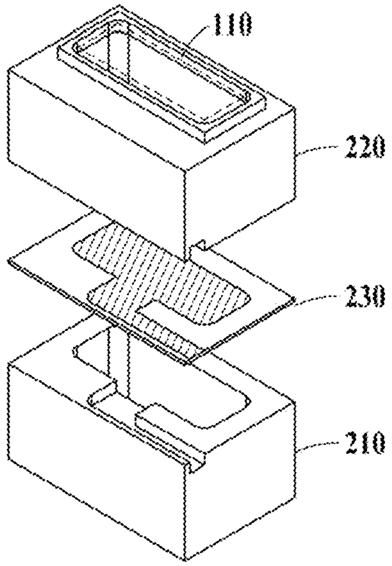

Referring to FIGS. 2A and 2B, 3D separation views of a waveguide-stripline feed transition element including a three-port network are illustrated. The waveguide-stripline feed transition element may include a lower element 210 in which a waveguide feed port is arranged, an upper element 220 including a slot opening for radiating a portion of input power transmitted through the waveguide feed port into the free space, and a circuit board 230 including a strip feed port for transmitting, to the waveguide-stripline, remaining input power except for the portion of the input power radiated through the slot opening and arranged between the upper element 220 and the lower element 210. The lower element 210 may provide an interface through the waveguide feed port for feeding the waveguide-stripline. The upper element 220 may serve as a cover for feeding the waveguide-stripline and may radiate the power into the free space through the slot opening. The circuit board 230 may include a conductive via-hole in an edge area of the circuit board 230 to provide for an electrical short circuit between the upper element 220 and the lower element 210.

Figure 2C:
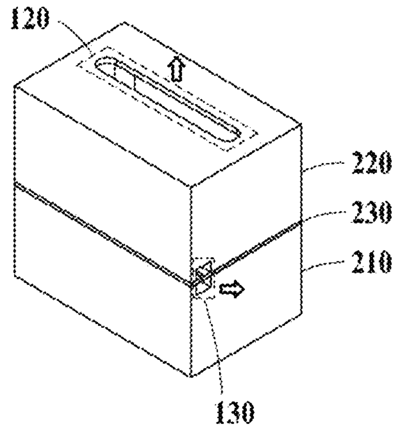
Figure 2D:
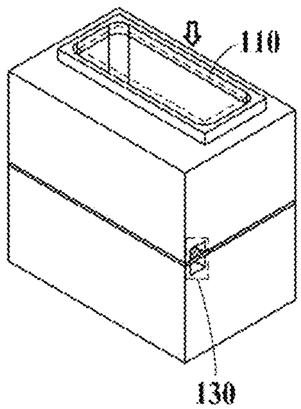

Referring to FIGS. 2C and 2D, 3D combination views of the waveguide-stripline feed transition element including a three-port network are illustrated. The waveguide-stripline feed transition element, according to at least one of an offset distance of the slot opening 120 (FIG. 2C) from a center line, a width of the slot opening 120, and a length of the slot opening 120, may adjust an amount of power transmitted to the strip feed port 130 and an amount of power radiated into the free space. As the offset distance of the slot opening 120 from the center line increases, the amount of the power radiated into the free space may decrease, and as at least one of the width of the slot opening 120 and the length of the slot opening 120 increases, the amount of the power radiated to the free space may increase. The strip feed port 130 may be used as a single unit including, for example, a small miniature assembly (SMA) connector port.

Figure 3:
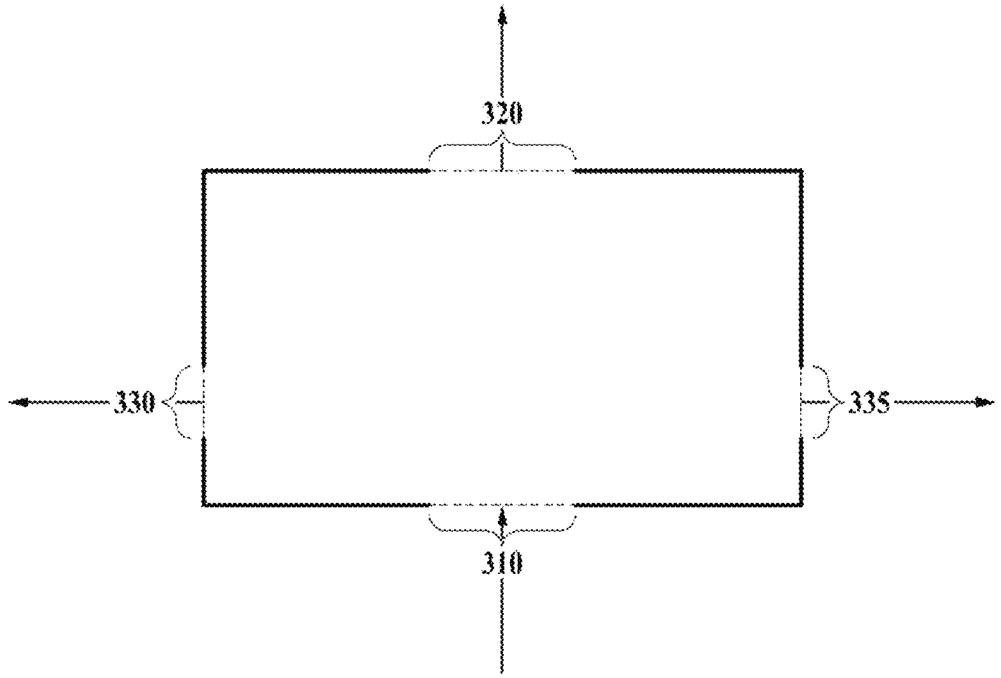
FIG. 3 is a block diagram illustrating a structure of a waveguide-stripline feed transition element including a four-port network, according to an embodiment.

FIG. 3 is a block diagram illustrating a structure of a waveguide-stripline feed transition element including a four-port network, according to an embodiment.

Referring to FIG. 3, the waveguide-stripline feed transition element including a four-port network, according to an embodiment, may include a lower element in which a waveguide feed port 310 is arranged, an upper element including a slot opening 320 for radiating a portion of input power transmitted through the waveguide feed port into a free space, a strip feed port 330 and a strip feed port 335 for transmitting, to a waveguide-stripline, remaining input power except for the portion of the input power radiated through the slot opening 320, and a circuit board located between the upper element and the lower element. The waveguide-stripline feed transition element including the four-port network may receive power input through the waveguide feed port 310, radiate a portion of the input power to the free space through the slot opening 320, and feed a remaining portion of the input power to a waveguide-stripline through the strip feed port 330 or the strip feed port 335.

FIGS. 4A to 4D are diagrams illustrating 3D separation views and 3D combination views of a waveguide-stripline feed transition element including a four-port network, according to an embodiment.

Figure 4A:
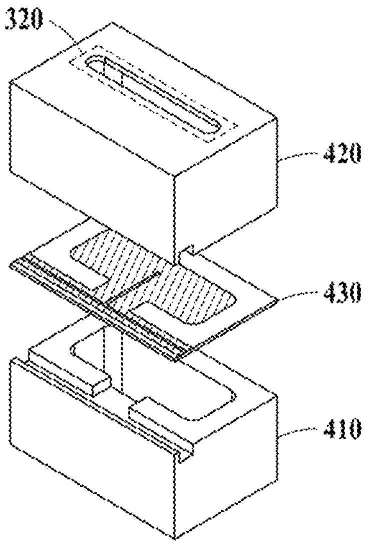
FIGS. 4A to 4D are diagrams illustrating 3D separation views and 3D combination views of a waveguide-stripline feed transition element including a four-port network, according to an embodiment.
Figure 4B:
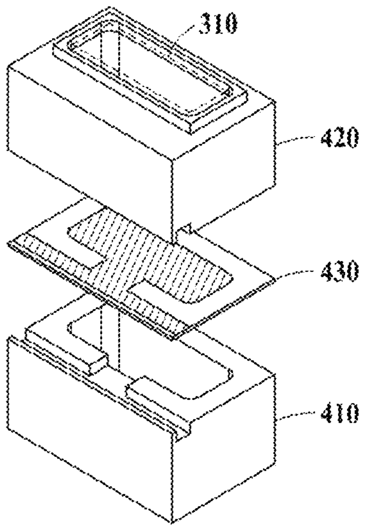

Referring to FIGS. 4A and 4B, the 3D separation views of the waveguide-stripline feed transition element including the four-port network are illustrated. The waveguide-stripline feed transition element may include a lower element 410 in which a waveguide feed port is arranged, an upper element 420 including a slot opening for radiating a portion of input power transmitted through the waveguide feed port to the free space, and a circuit board 430 including a strip feed port for transmitting, to the waveguide-stripline, remaining input power except for the portion of the input power radiated through the slot opening and arranged between the upper element 420 and the lower element 410. The lower element 410 may provide an interface through the waveguide feed port for feeding the waveguide-stripline. The upper element 420 may serve as a cover for feeding the waveguide-stripline and may radiate the power to the free space through the slot opening. The circuit board 430 may include a conductive via-hole in an edge area of the circuit board 430 to provide for an electrical short circuit between the upper element 420 and the lower element 410.

Figure 4C:
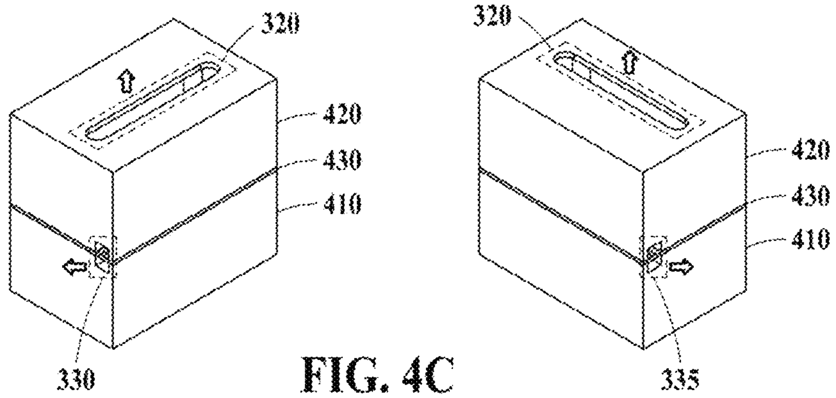
Figure 4D:
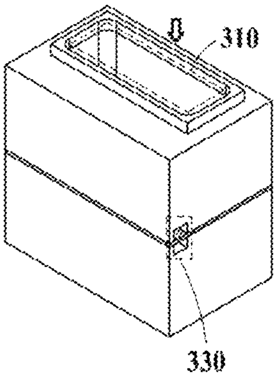

Referring to FIGS. 4C and 4D, 3D combination views of the waveguide-stripline feed transition element including a four-port network are illustrated. The waveguide-stripline feed transition element, according to at least one of an offset distance of the slot opening 320 from a center line, a width of the slot opening 320, and a length of the slot opening 320, may adjust an amount of power transmitted to the strip feed port 330 and the strip feed port 335 (FIG. 4C) and an amount of power radiated to the free space. The strip feed port 330 may transmit the remaining input power except for the portion of the input power radiated through the slot opening 320 in a first direction, and the strip feed port 335 may transmit the remaining input power in a second direction opposite from the first direction. As the offset distance of the slot opening 320 from the center line increases, the amount of the power radiated to the free space may decrease, and as at least one of the width of the slot opening 320 and the length of the slot opening 320 increases, the amount of the power radiated to the free space may increase. The strip feed port 330 may be used as a single unit including, for example, an SMA connector port.

Figure 5A:
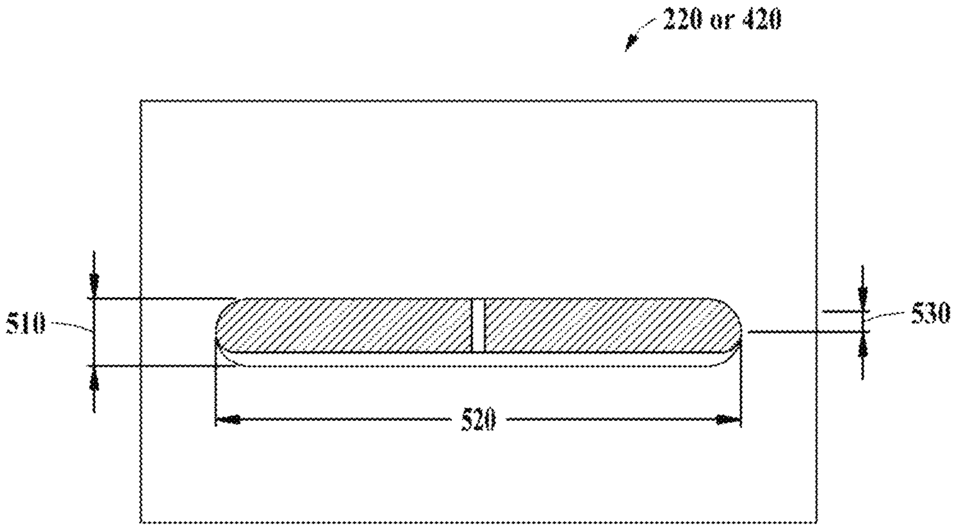
FIGS. 5A and 5B are diagrams illustrating changes in an offset location of a slot opening in an upper element according to an embodiment.
Figure 5B:
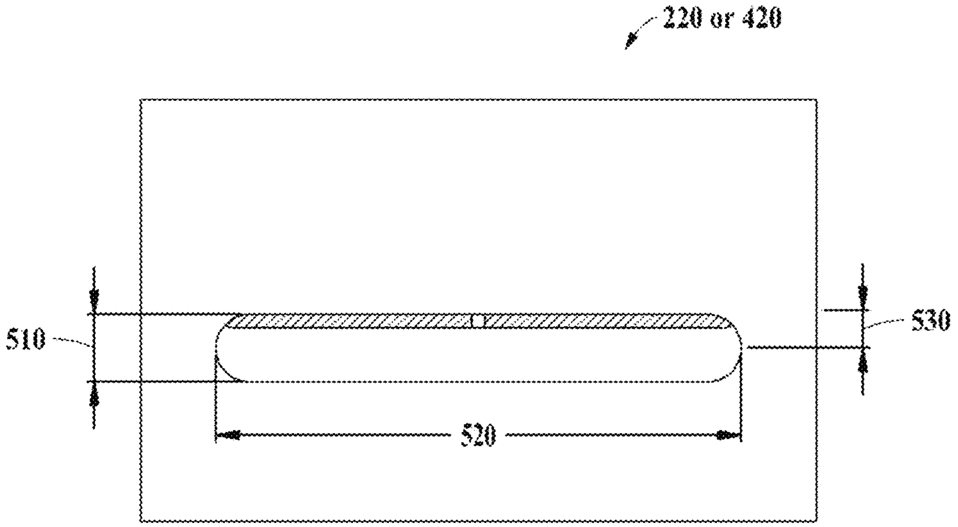

FIGS. 5A and 5B are diagrams illustrating changes in an offset location of a slot opening in an upper element according to an embodiment.

Referring to FIGS. 5A and 5B, a width 510, a length 520, an offset location 530, and an offset location 530 of the slot opening in the upper element (the upper element 220 or the upper element 420) and open into the free space are illustrated. Power transmitted into the waveguide feed port may generally include a sum of power radiated into the free space through the slot opening, power transmitted into the strip feed port, internal insertion loss power, and power reflected to the input. If a sum of the internal insertion loss power and the power reflected to the input are significantly small, the power transmitted into the waveguide feed port may be expressed as a sum of the power radiated into the free space and the power transmitted to the strip feed port.

An amount of the power radiated into the free space may increase as at least one of the width 510 of the slot opening and the length 520 of the slot opening increases. When the offset location 530 of the slot opening of FIG. 5B increases compared to the offset location 530 of the slot opening of FIG. 5A, the slot opening moves away from the center line to weaken a strength of an electric field, which is combined from the slot opening, and the amount of the power radiated into the free space may decrease. Since an input matching characteristic in the waveguide feed port may change according to a location of the slot opening, designing an input matching correction for an optimal waveguide feed port may be necessary.

Figure 6:
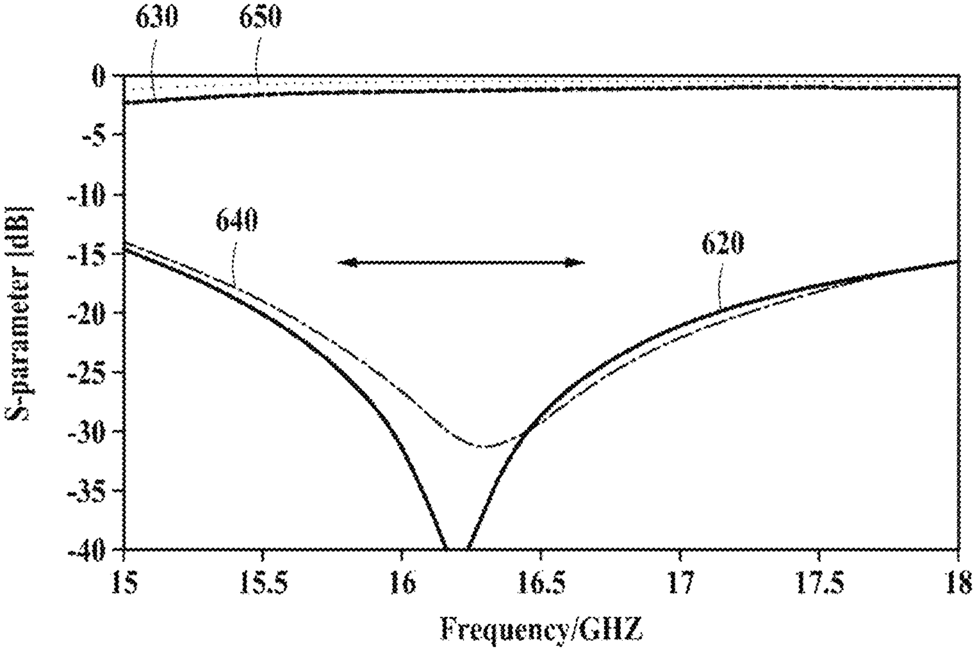
FIG. 6 is a graph illustrating changes in S-parameters of a waveguide-stripline feed transition element according to changes in an offset location according to an embodiment.

FIG. 6 is a graph illustrating changes in S-parameters in dB vs. Frequency in GHz of a waveguide-stripline feed transition element according to changes in an offset location according to an embodiment.

Referring to FIG. 6, when an offset location of a slot opening of a first waveguide-stripline feed transition element increases within an operating bandwidth 620, power transmitted to a waveguide-stripline increases. The bandwidth 620 shows S-parameter values of an input reflection loss when the offset location of the slot opening is a first location. A graph 630 shows S-parameter values of power to be provided to a remaining waveguide-stripline feed transition element when the offset location of the slot opening is the first location. A graph 640 shows the S-parameter values of the input reflection loss when the offset location of the slot opening is a second location, increased from the first location. A graph 650 shows S-parameter values of power to be provided to a remaining waveguide-stripline feed transition element when the offset location of the slot opening is the second location, increased from the first location. When the offset position of the slot opening is the second location, increased from the first location, power radiated into a free space through the slot opening decreases, so power transmitted to the remaining waveguide-stripline feed transition element through the strip feed port may increase more in an entire input power.

Figure 7:
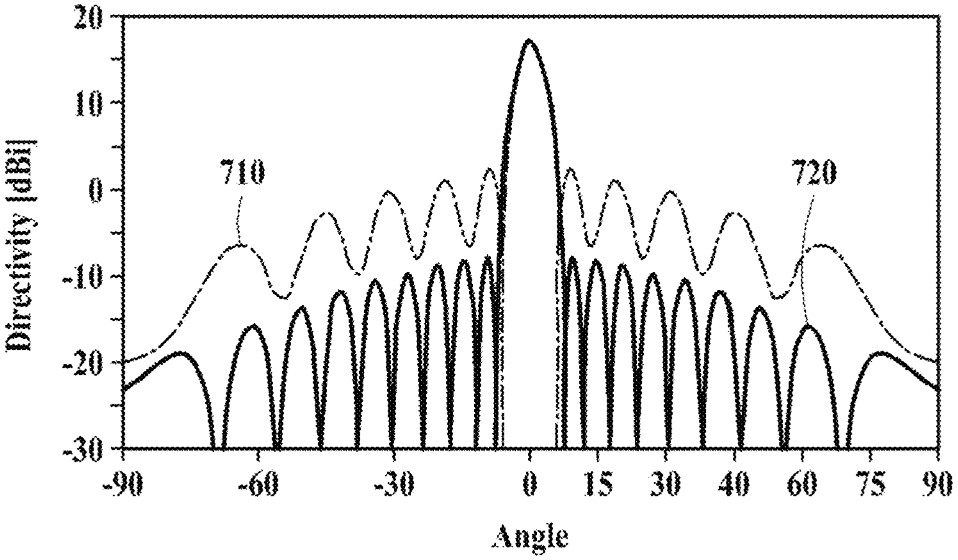
FIG. 7 is a graph illustrating characteristics of radiation patterns of a waveguide-stripline feed transition element according to an embodiment.

FIG. 7 is a graph illustrating characteristics of radiation patterns shown in Directivity in dBi vs. Angle in degree of a waveguide-stripline feed transition element according to an embodiment.

Referring to FIG. 7, for example, characteristics of radiation patterns of openings of a 1×12 array, including a 1×6 sub-array as a series-feed circuitry, are shown. Here, a radiation characteristic of unit-arranged elements may be identical without inter-combination between array elements, and the radiation patterns may be as follows.

$$F(\theta) = f(\theta)\sum_{n=1}^{N} A_n e^{j\beta(n-1)d_x \cos\theta} \quad \text{[Equation 1]}$$

Here, F(θ) denotes radiation patterns of a linear array antenna, f(θ) denotes radiation patterns of the unit-arranged elements, An denotes an amplitude coefficient of the unit-arranged elements, θ denotes an observation angle, n denotes a number of array elements (N being a natural number), dx denotes a spacing between the array elements, and β denotes a propagation constant (=2π/λc).

When a radiation patterns graph 710, in which a conventional waveguide feed port is used, is compared to a radiation patterns graph 720, in which a waveguide-stripline feed transition element having a radiation function is used, for example, a side lobe level characteristic may decrease and a 3 dB beam width may increase by about 0.9°. Through the comparison, it may be confirmed that when the waveguide-stripline feed transition element having a radiation function is used, an antenna efficiency increases under a condition of an array antenna having a same array and a range of an electronic beam scan increases.

Figure 8:
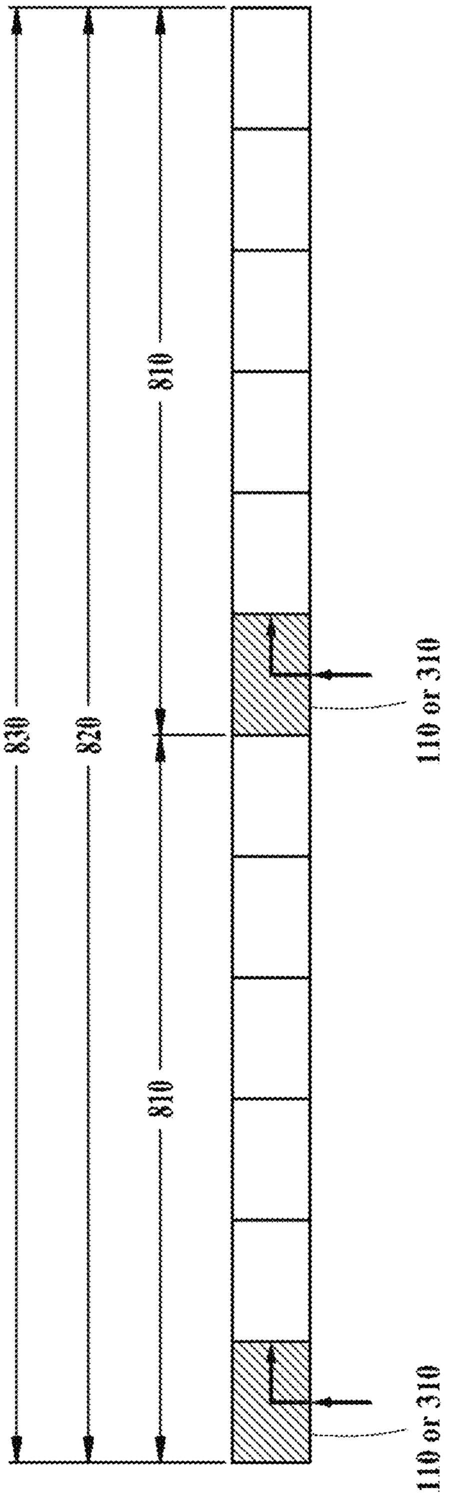
FIG. 8 is a block diagram illustrating a structure of a linear array antenna using a waveguide-stripline feed transition element, according to an embodiment.

FIG. 8 is a block diagram illustrating a structure of a linear array antenna using a waveguide-stripline feed transition element, according to an embodiment.

Referring to FIG. 8, a structure is shown, in which input power is transmitted to a waveguide feed port 110 or 310 of a first array element and the input power is transmitted to a remaining feed port. A length 810 of sub-arrays included in the linear array antenna is identical to a length of a sub-array including a plurality of arranged feed ports, as in the prior art. However, when a feed element having a radiation function is used, a distance between sub-arrays is not identical to a distance between the feed elements, so a length 820 of an entire array, for example, may be twice the length 810 of the sub-arrays. Accordingly, a physical length 830 of the linear array antenna also decreases to increase antenna performance, such as increasing an opening efficiency of the linear array antenna, reducing a side lobe level characteristic, increasing a 3 dB beam width, and increasing a range of an electronic beam scan.

Figure 9A:
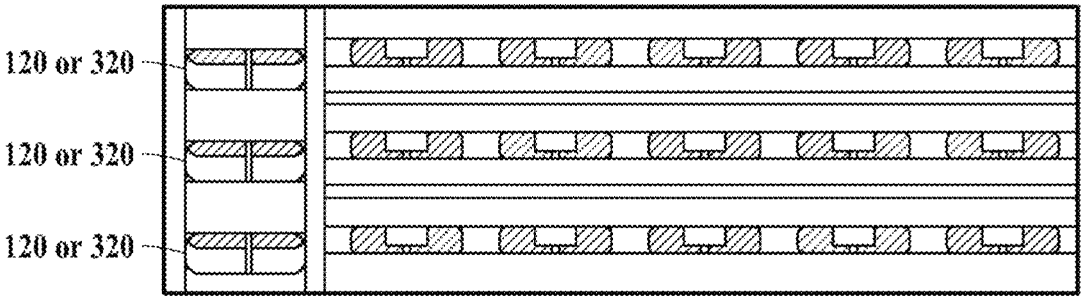
FIGS. 9A to 9C are diagrams illustrating a structure of a planar array antenna using a waveguide-stripline feed transition element according to an embodiment.
Figure 9B:
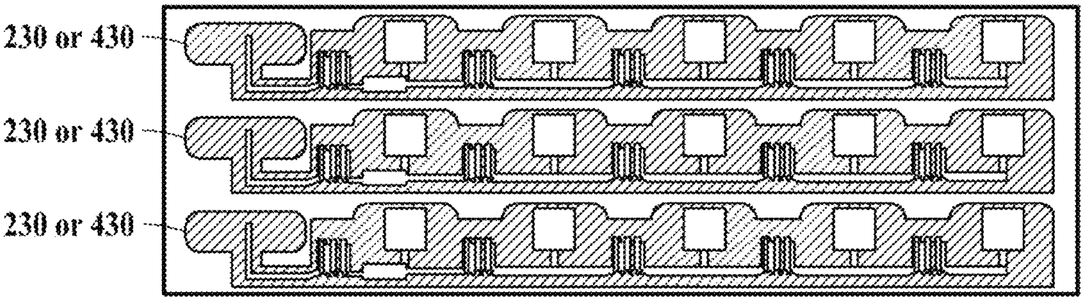
Figure 9C:

FIGS. 9A to 9C are diagrams illustrating a structure of a planar array antenna using a waveguide-stripline feed transition element according to an embodiment.

Referring to FIG. 9A, for example, a front view of a planar array antenna including a 3×6 array is shown. The planar array antenna may radiate a portion of power input through the slot opening 120 or the slot opening 320 into a free space.

Referring to FIG. 9B, the circuit board 230 or the circuit board 430 may include a strip feed port transmitting remaining input power except for the portion of the input power radiated through the slot opening, and may be arranged between an upper element and a lower element. The circuit board 230 or the circuit board 430 may include a conductive via-hole in an edge area of the circuit board 230 or the circuit board 430 to provide for an electrical short circuit between the upper element and the lower element.

Referring to FIG. 9C, a rear view of the planar array antenna including the 3×6 array is shown. The planar array antenna may receive the input power through the waveguide feed port 110 or the waveguide feed port 310.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

Embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the embodiment described above may be recorded in non-transitory computer-readable media including program instructions to implement various operations of the embodiments described above. The media may also include, alone or in combination with the program instructions, data files, data structures, and the like. The program instructions recorded on the media may be those specially designed and constructed for the purposes of an embodiment, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The devices described above may be configured to act as one or more software modules in order to perform the operations of the embodiments described above, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A waveguide-stripline feed transition element comprising:

a lower element in which a waveguide feed port is arranged;

an upper element comprising a slot opening configured to radiate a portion of input power transmitted through the waveguide feed port into a free space; and a circuit board comprising a strip feed port configured to transmit, to a waveguide-stripline, remaining input power except for the portion of the input power radiated through the slot opening, the circuit board being arranged between the upper element and the lower element, wherein the waveguide-stripline feed transition element is configured to adjust an amount of the remaining input power transmitted through the strip feed port to the waveguide-stripline and an amount of the portion of the input power radiated into the free space, according to an offset distance from a center line of the slot opening.

2. The waveguide-stripline feed transition element of claim 1, wherein the strip feed port comprises:

a first strip feed port configured to transmit, to a first waveguide-stripline, the remaining input power except for the portion of the input power radiated through the slot opening in a first direction; and a second strip feed port configured to transmit, to a second waveguide-stripline, the remaining input power in a second direction, opposite to the first direction.

3. The waveguide-stripline feed transition element of claim 1, wherein the waveguide-stripline feed transition element is further configured to adjust the amount of the remaining input power transmitted through the strip feed port to the waveguide-stripline and the amount of the portion of the input power radiated into the free space, according to at least one of a width of the slot opening and a length of the slot opening.

4. The waveguide-stripline feed transition element of claim 3, wherein the amount of the portion of the input power radiated into the free space decreases as the offset distance from the center line of the slot opening increases.

5. The waveguide-stripline feed transition element of claim 3, wherein the amount of the portion of the input power radiated into the free space increases as at least one of the width of the slot opening and the length of the slot opening increases.

6. An antenna comprising a plurality of waveguide-stripline feed transition elements arranged in a horizontal direction, wherein each one of the waveguide-stripline feed transition element comprises:

a respective lower element in which a corresponding waveguide feed port is arranged;

a respective upper element comprising a corresponding slot opening configured to radiate a portion of input power transmitted through the corresponding waveguide feed port into a free space; and a respective circuit board comprising a corresponding strip feed port configured to transmit, to a corresponding waveguide-stripline, remaining input power except for the portion of the input power radiated through the corresponding slot opening, the respective circuit board being arranged between the corresponding upper element and the corresponding lower element, wherein the corresponding waveguide-stripline feed transition element is configured to adjust an amount of the remaining input power transmitted through the corresponding strip feed port to the corresponding waveguide-stripline and an amount of the portion of the input power radiated into the free space, according to a respective offset distance from a center line of the corresponding slot opening.

7. The antenna of claim 6, wherein the corresponding strip feed port comprises:

a respective first strip feed port configured to transmit, to a corresponding first waveguide-stripline, the remaining input power except for the portion of the input power radiated through the corresponding slot opening in a first direction; and a respective second strip feed port configured to transmit, to a corresponding second waveguide-stripline, the remaining input power in a second direction, opposite to the first direction.

8. The antenna of claim 6, wherein the plurality of arranged waveguide-stripline feed transition elements are disconnected from each other and have a same radiation characteristic.

9. The antenna of claim 6, wherein the corresponding waveguide-stripline feed transition element is further configured to adjust the amount of the remaining input power transmitted through the corresponding strip feed port to the corresponding waveguide-stripline and the amount of the portion of the input power radiated into the free space, according to at least one of a width of the corresponding slot opening and a length of the corresponding slot opening.

10. The antenna of claim 9, wherein the amount of the portion of the input power radiated into the free space decreases as the respective offset distance from the center line of the corresponding slot opening increases.

11. The antenna of claim 9, wherein the amount of the portion of the input power radiated into the free space increases as at least one of the width of the corresponding slot opening and the length of the corresponding slot opening increases.

* * * * *